US012602540B2

(12) United States Patent
Wang et al.

(10) Patent No.: US 12,602,540 B2
(45) Date of Patent: Apr. 14, 2026

(54) LEVERAGING A LARGE LANGUAGE MODEL ENCODER TO EVALUATE PREDICTIVE MODELS

(71) Applicant: Microsoft Technology Licensing, LLC, Redmond, WA (US)

(72) Inventors: Xiaoqing Wang, Mountain View, CA (US); Sriram Vasudevan, Mountain View, CA (US); Shaghayegh Gharghabi, Mountain view, CA (US); Huichao Xue, Sunnyvale, CA (US); Harshul Mulchandani, Moorpark, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 18/393,807

(22) Filed: Dec. 22, 2023

(65) Prior Publication Data

US 2025/0209262 A1 Jun. 26, 2025

(51) Int. Cl.
*G06F 40/20* (2020.01)
*G06F 11/34* (2006.01)

(52) U.S. Cl.
CPC .......... *G06F 40/20* (2020.01); *G06F 11/3495* (2013.01)

(58) Field of Classification Search
None
See application file for complete search history.

(56) References Cited

U.S. PATENT DOCUMENTS 8,843,427 B1 * 9/2014 Lin ........................ G06N 20/00
705/16
10,671,933 B2 * 6/2020 Dong ...................... G06F 17/18
(Continued)

FOREIGN PATENT DOCUMENTS

EP 3542322 B1 * 11/2021 ............. G06N 20/00
WO WO-2021257160 A1 * 12/2021 ........... G06F 18/214

OTHER PUBLICATIONS

Olson, David L., and Dursun Delen. "Performance evaluation for predictive modeling." Advanced data mining techniques. Berlin, Heidelberg: Springer Berlin Heidelberg, 2008. (Year: 2008).*
(Continued)

*Primary Examiner* — Pierre Louis Desir
*Assistant Examiner* — Sean Thomas Smith
(74) *Attorney, Agent, or Firm* — Cantor Colburn LLP; Renee D. Brown

(57) ABSTRACT

Aspects of the disclosure include methods for evaluating a predictive model. An exemplary method includes training an evaluation model to output, for an input first entity-second entity pair, a content relevancy prediction. A large language model encoder of the evaluation model generates a first embedding for the first entity and a second embedding for the second entity. The embeddings are fed to an interaction tower to produce a logit and the logit is passed with true labels to a loss function for fine-tuning. The true labels include labeled training data generated by modifying training data having a first proportion of negative labeled data to provide a second proportion of negative labeled data greater than the first proportion. The evaluation model is used to score a performance of a predictive model based at least in part on a comparison of predictions made by the respective models for a same entity pair.

20 Claims, 8 Drawing Sheets

(56)                References Cited

U.S. PATENT DOCUMENTS

| | | | | |
|---|---|---|---|---|
| 11,954,126 | B2 * | 4/2024 | Srinivasan | G06N 20/00 |
| 2015/0170056 | A1 * | 6/2015 | Breckenridge | G06N 7/01 |
| | | | | 706/12 |
| 2017/0323216 | A1 * | 11/2017 | Fano | G06N 20/00 |
| 2021/0295204 | A1 * | 9/2021 | Bhide | G06N 5/04 |
| 2023/0072913 | A1 * | 3/2023 | Xu | G06N 20/00 |
| 2023/0376700 | A1 * | 11/2023 | Bista | G10L 15/22 |

OTHER PUBLICATIONS

Farion, Ken J., et al. "Comparing predictions made by a prediction model, clinical score, and physicians." Applied clinical informatics 4.03 (2013). (Year: 2013).*

Yang, Bishan, et al. "Embedding entities and relations for learning and inference in knowledge bases." arXiv preprint arXiv: 1412. 6575 (2014). (Year: 2014).*

Ghasedi Dizaji, Kamran, et al. "Deep clustering via joint convolutional autoencoder embedding and relative entropy minimization." Proceedings of the IEEE international conference on computer vision. 2017. (Year: 2017).*

Haeusser, Philip, et al. "Associative deep clustering: Training a classification network with no labels." German conference on pattern recognition. Cham: Springer International Publishing, 2018. (Year: 2018).*

Sun, Zhiqing, et al. "Rotate: Knowledge graph embedding by relational rotation in complex space." arXiv preprint arXiv:1902. 10197 (2019). (Year: 2019).*

Wang, Bin, et al. "Evaluating word embedding models: Methods and experimental results." APSIPA transactions on signal and information processing 8 (2019). (Year: 2019).*

Gilardi, et al., "ChatGPT Outperforms Crowd-Workers for Text-Annotation Tasks", In Repository of arXiv:2303.15056v1, Jul. 19, 2023, 13 Pages.

* cited by examiner

Training Phase
110

Figure 7:
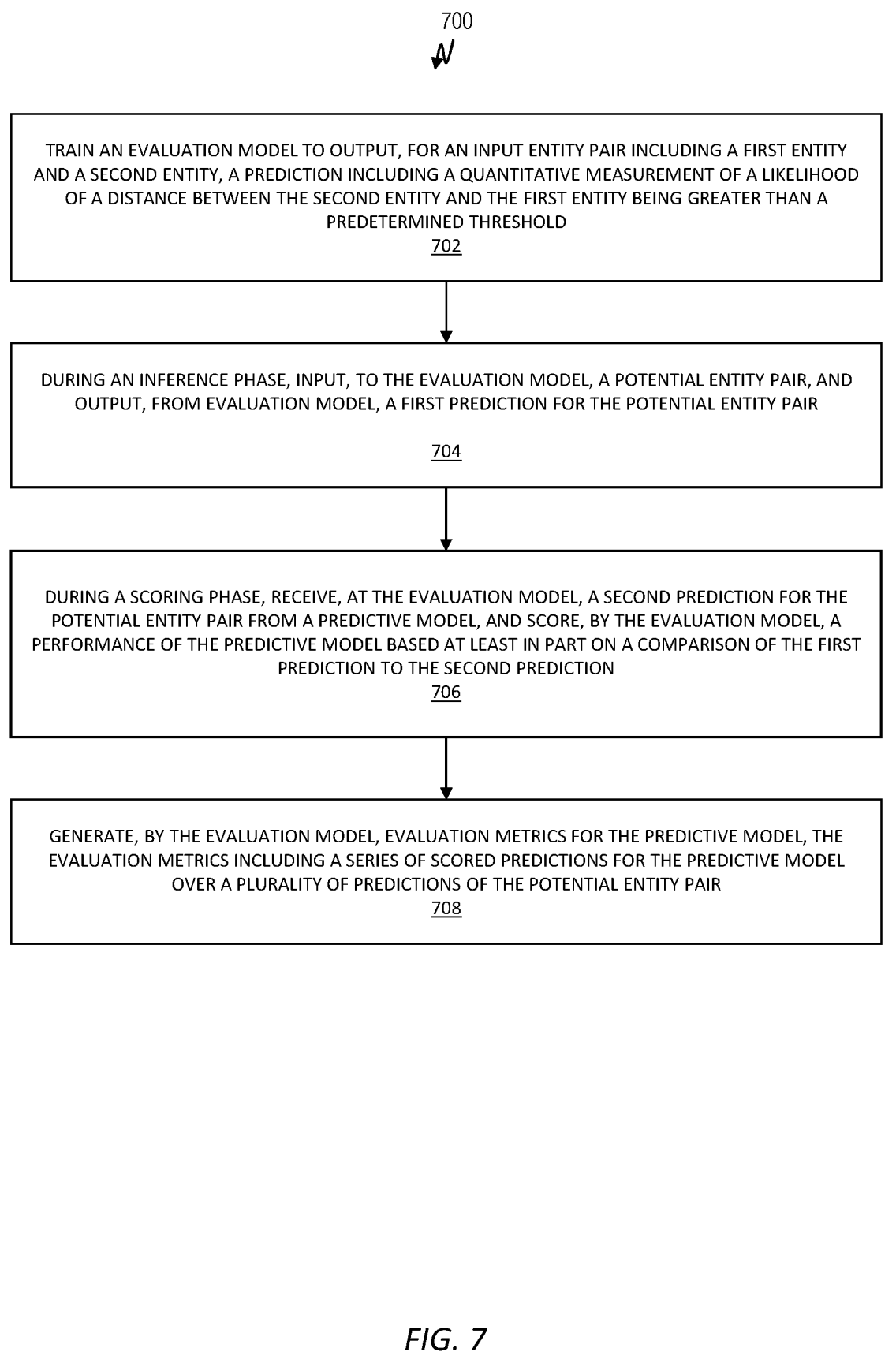

700

TRAIN AN EVALUATION MODEL TO OUTPUT, FOR AN INPUT ENTITY PAIR INCLUDING A FIRST ENTITY AND A SECOND ENTITY, A PREDICTION INCLUDING A QUANTITATIVE MEASUREMENT OF A LIKELIHOOD OF A DISTANCE BETWEEN THE SECOND ENTITY AND THE FIRST ENTITY BEING GREATER THAN A PREDETERMINED THRESHOLD
702

DURING AN INFERENCE PHASE, INPUT, TO THE EVALUATION MODEL, A POTENTIAL ENTITY PAIR, AND OUTPUT, FROM EVALUATION MODEL, A FIRST PREDICTION FOR THE POTENTIAL ENTITY PAIR

704

DURING A SCORING PHASE, RECEIVE, AT THE EVALUATION MODEL, A SECOND PREDICTION FOR THE POTENTIAL ENTITY PAIR FROM A PREDICTIVE MODEL, AND SCORE, BY THE EVALUATION MODEL, A PERFORMANCE OF THE PREDICTIVE MODEL BASED AT LEAST IN PART ON A COMPARISON OF THE FIRST PREDICTION TO THE SECOND PREDICTION
706

GENERATE, BY THE EVALUATION MODEL, EVALUATION METRICS FOR THE PREDICTIVE MODEL, THE EVALUATION METRICS INCLUDING A SERIES OF SCORED PREDICTIONS FOR THE PREDICTIVE MODEL OVER A PLURALITY OF PREDICTIONS OF THE POTENTIAL ENTITY PAIR
708

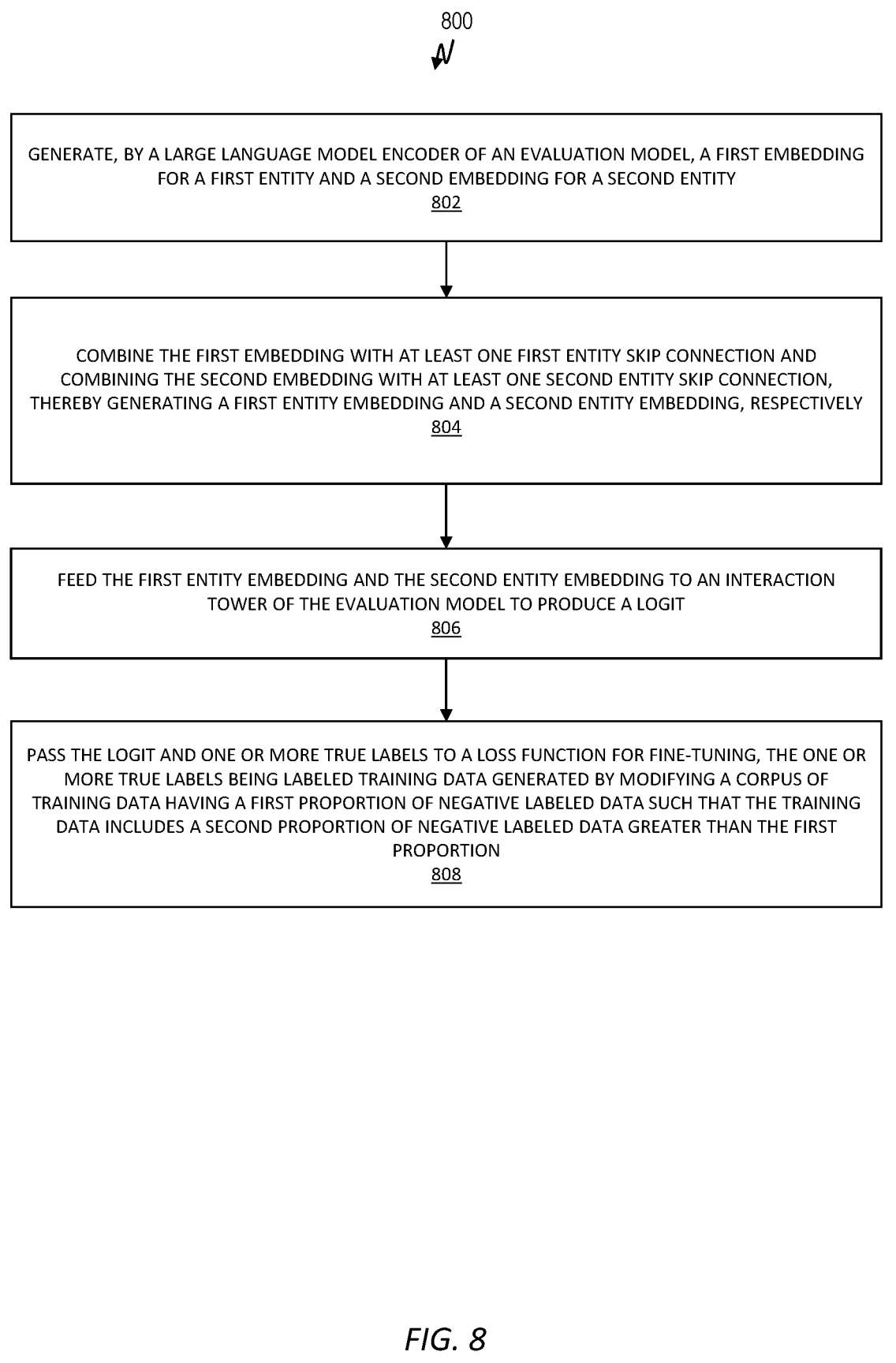

GENERATE, BY A LARGE LANGUAGE MODEL ENCODER OF AN EVALUATION MODEL, A FIRST EMBEDDING FOR A FIRST ENTITY AND A SECOND EMBEDDING FOR A SECOND ENTITY
802

COMBINE THE FIRST EMBEDDING WITH AT LEAST ONE FIRST ENTITY SKIP CONNECTION AND COMBINING THE SECOND EMBEDDING WITH AT LEAST ONE SECOND ENTITY SKIP CONNECTION, THEREBY GENERATING A FIRST ENTITY EMBEDDING AND A SECOND ENTITY EMBEDDING, RESPECTIVELY
804

FEED THE FIRST ENTITY EMBEDDING AND THE SECOND ENTITY EMBEDDING TO AN INTERACTION TOWER OF THE EVALUATION MODEL TO PRODUCE A LOGIT
806

PASS THE LOGIT AND ONE OR MORE TRUE LABELS TO A LOSS FUNCTION FOR FINE-TUNING, THE ONE OR MORE TRUE LABELS BEING LABELED TRAINING DATA GENERATED BY MODIFYING A CORPUS OF TRAINING DATA HAVING A FIRST PROPORTION OF NEGATIVE LABELED DATA SUCH THAT THE TRAINING DATA INCLUDES A SECOND PROPORTION OF NEGATIVE LABELED DATA GREATER THAN THE FIRST PROPORTION
808

*FIG. 8*

LEVERAGING A LARGE LANGUAGE MODEL ENCODER TO EVALUATE PREDICTIVE MODELS

The subject disclosure relates to online job search, job search networks, job recommendations, and the use of large language models to scale system architectures, and particularly to leveraging a large language model encoder to evaluate the predictions of a predictive model, for example, of the relevancy of job impressions made within a career-based social network.

A BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 7 depicts a flowchart of a method in accordance with one or more embodiments; and FIG. 8 depicts a flowchart of a method in accordance with one or more embodiments.

Figure 1:
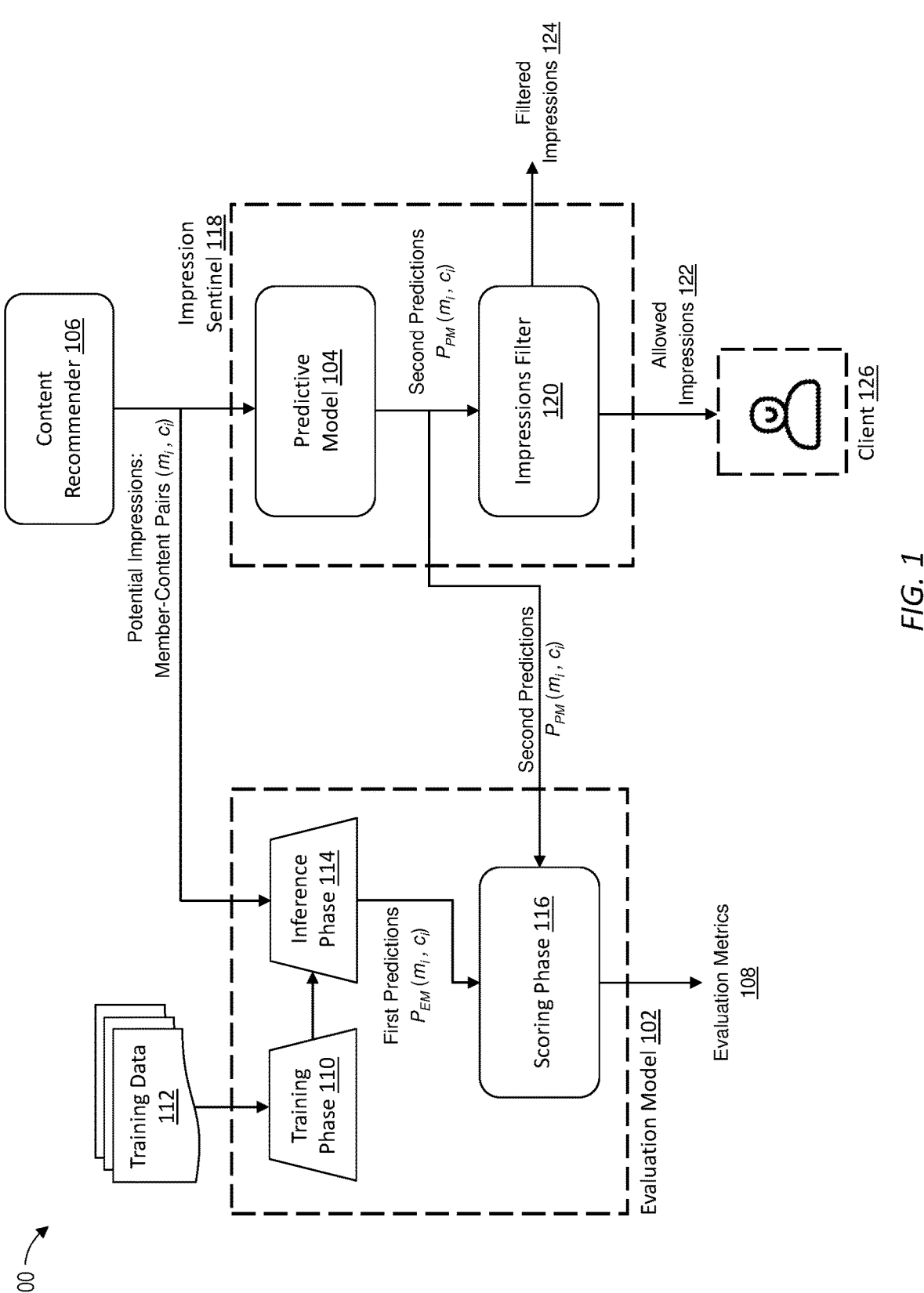
FIG. 1 depicts a block diagram for a model evaluation system powered by an evaluation model to evaluate a predictive model in accordance with one or more embodiments.

The diagrams depicted herein are illustrative. There can be many variations to the diagram or the operations described therein without departing from the spirit of this disclosure. For instance, the actions can be performed in a differing order or actions can be added, deleted or modified.

In the accompanying figures and following detailed description of the described embodiments of this disclosure, the various elements illustrated in the figures are provided with two or three-digit reference numbers. With minor exceptions, the leftmost digit(s) of each reference number corresponds to the figure in which its element is first illustrated.

DETAILED DESCRIPTION

Overview

Algorithmic content recommendation systems are sophisticated technology platforms designed to provide users with personalized suggestions for relevant content. These types of systems often rely on advanced algorithms to analyze user data, preferences, and contextual information to generate tailored content recommendations. Algorithmic content recommendation systems can be employed in various digital platforms, such as streaming services, e-commerce websites, social media platforms, and news websites, to enhance user engagement by delivering content tailored to individual preferences and behaviors. For example, an algorithmic content recommendation system might, in the context of a social network, serve recommendations (also referred to as impressions) for people and content, such as a list of people to reach out to, videos to watch, articles to read, learning courses and resources to consider, etc., and these recommendations might be curated according to shared characteristics and/or interests of the respective user. In another example, a career-based social network might utilize algorithmic content recommendation systems to serve relevant, high quality job recommendations (job impressions) to users.

Due to the sheer volume of potential content available, algorithmic content recommendation systems, if properly configured, can play a crucial role in enhancing the user experience by providing personalized content suggestions to users for content (e.g., jobs) that may otherwise go unnoticed by the user. An effective impression made by an algorithmic content recommendation system is an impression for content (e.g., a job opening) that is of high subjective and/or objective interest to the respective user. Thus, one goal of these systems might be to find and deliver content (via impressions) that are probabilistically determined to be of sufficient subjective/objective interest. The degree of probabilistic interest (e.g., sufficiency) needed to trigger an impression can itself be a predetermined threshold that can be tuned aggressively (lean towards more impressions) or conservatively (lean toward fewer impressions), as desired.

Many algorithmic content recommendation systems are natively probabilistic, meaning that even well-designed systems will allow some (ideally small) percentage of impressions for "irrelevant" content to be made to users. As used herein, an "irrelevant" content impression is a content recommendation for content that is objectively and/or subjectively unsuitable for the respective user. For example, an irrelevant content impression might be an impression for content having at least one characteristic that is wholly or partially mismatched to at least one characteristic of the respective user. In another example, an irrelevant content impression might be an impression for content that is separated from the respective user within an encoding space by a distance that is greater than a predetermined threshold (in contrast, relevant content might refer to content that is within the predetermined threshold distance from the user within an encoding space).

To illustrate, consider the context of a career-based social network. An objectively unsuitable content impression might be a job recommendation for an "entry level" busser for a local restaurant delivered to a member that is currently the "head chef" of a large restaurant chain. This is an irrelevant job recommendation because a head chef will not be expected to have any interest in an entry level busser position (e.g., this is both an experience mismatch and a job function mismatch). In another career-based social network example, consider a job recommendation for a "data scientist" with a requirement of 1-3 years of experience delivered to a user that is currently the "accounting lead" of a research lab with 15 years of experience. This is an irrelevant recommendation because an accountant, even at a research lab, is not interested in a position as a data scientist (e.g., an occupation/industry mismatch) and because the respective member has years of experience and is not interested in a nearly entry level position (e.g., an experience mismatch). These examples of irrelevant content impressions are illustrative only and need not be limited to those which occur in a career-based social network. For example, a social network might be configured to provide members with article recommendations based on their background/industry/experience. In this context, an irrelevant recommendation might be one where the skills listed for a member based on their current profession (e.g., "patent law engineer") should not lead to a recommendation of an article on corporate law.

Serving users irrelevant content recommendations can result in several consequences, particularly in terms of user engagement, ranging from frustration and disengagement to a loss of trust and ultimately, a more negative perception of the platform. Thus, a goal of any platform or network that employs algorithmic content recommendation systems is to reduce (or filter) irrelevant impressions as much as possible.

Some algorithmic content recommendation systems rely on predictive models configured to predict whether a potential content impression would be irrelevant to a particular user. The content that is predicted to be irrelevant content can then be filtered from the impressions made to the users. Unfortunately, it is difficult to verify whether the set of impressions predicted to be irrelevant (and conversely, those impressions predicted to be relevant) were actually irrelevant (or not). Conventionally, human annotators are relied upon to evaluate these types of predictions, but this process is slow and difficult to scale.

Complicating matters further, training predictive models to evaluate the relevancy of potential content impressions is inherently limited by the quality of the underlying training data used to train such systems. In particular, sourcing labeled negative training data can be difficult. Consider, in the context of a career-based social network, for example, a scenario where a first job impression is made to a user and the user selects and ultimately applies for a job via the first job impression. It is fairly straightforward to label this first job impression as a positive job impression for the user. Now consider a scenario where a second job impression is made to the user that the user ignores or otherwise fails to interact with. It is not clear that the second job impression is an irrelevant impression. While the job impression might be irrelevant, it is also possible, for example, that the job impression is objectively and/or subjectively relevant, but the user is simply not interested in a career change at this time.

This disclosure introduces an evaluation model architecture that leverages a large language model encoder to evaluate the predictions of a predictive model. In some embodiments, the predictions are relevancy predictions for potential (or delivered) content impressions. For example, the evaluation model described herein can be fine-tuned to evaluate the relevancy predictions (e.g., relevant vs. irrelevant) for job impressions made by a predictive model within a career-based social network. Rather than relying on human annotators to evaluate whether a set of content impressions predicted as irrelevant were actually irrelevant, the evaluation model is fine-tuned over a corpus of entity pairs (e.g., content-user pairs) to separately determine whether content delivered to a user was irrelevant. For example, in the context of a career-based social network, the evaluation model can be fine-tuned to determine whether a particular job-user pair represents an irrelevant content impression (that is, whether the respective job is irrelevant to the respective user). These entity pair (e.g., job-user) pair determinations can be compared against the predictions made by the predictive model to evaluate its performance.

In some embodiments, the evaluation model described herein leverages a large language model encoder to generate entity embeddings (e.g., first embedding(s) for a first entity, such as a user, and second embedding(s) for a second entity, such as a job impression) that can be passed through an interaction tower to make independent content relevancy predictions, thereby providing an evaluation model that can better score the performance of the predictive model (e.g., the accuracy of allowed vs. screened job impressions). Notably, while discussed primarily in the context of scoring the member-job pairing predictions made by a predictive model within a career-based social network, evaluation models trained according to the present disclosure can be leveraged to evaluate the content relevancy predictions of any predictive model for any input first entity-second entity pair (e.g., member-content pairs) and all such configurations are within the contemplated scope of this disclosure. For example, the evaluation model described herein can evaluate the relevancy predictions for recommended connections/ friends, recommended videos, news articles, publications, etc., recommended learning resources, courses, etc.—the scope of the content is not meant to be particularly limited.

In some embodiments, the performance scores made by the evaluation model are used to guide predictive model ramps. For example, a version update to the predictive model can be evaluated and, if performance suffers (that is, relevant-irrelevant prediction accuracy drops), the predictive model can be rolled back to the prior version.

Advantageously, the evaluation model is trained on diverse training data created by modifying (e.g., filtering, sampling, etc.) an initial corpus of training data to improve data diversity. In some embodiments, the initial corpus of training data has a relatively low diversity of negative labeled data (with respect to positive labeled data) and modifying the initial corpus includes increases a ratio of negative labeled data to positive labeled data. In some embodiments, modifying includes generating so-called random negative data and Embedding Based Retrieval (EBR) augmented negative data from the initial corpus of training data to improve the variety of labeled negative training data available. Random negative data and EBR augmented negative data are discussed in greater detail with respect to FIG. 5.

Powering an evaluation model with a large language model encoder as described herein solves a number of somewhat related technical issues with current content recommendation systems. In particular, the evaluation model greatly improves scalability over current human annotation-constrained content evaluation systems. In addition, the evaluation model solves the current problem of a lack of adequate evaluation metrics to guide predictive model development (sometimes referred to as ramps). Moreover, the use of random negative data and EBR augmented negative data greatly expands the quality of the labeled negative training data used during the training phase, improving inferences made during the inference phase by the evaluation model (i.e., the model is able to better distinguish between relevant and irrelevant content recommendations). The result is a much more efficient and scalable evaluation of the predictive model, higher quality content recommendations (e.g., job impressions), more screened irrelevant content impressions, and an overall more pleasant experience for users.

DETAILED EMBODIMENT

FIG. 1 depicts a block diagram for a model evaluation system 100 powered by an evaluation model 102 to evaluate the performance of the predictions (e.g., content impression relevancy predictions) made by a predictive model 104 in accordance with one or more embodiments. In some embodiments, the evaluation model 102 receives potential entity pairs (entity 1, entity 2) and relevancy predictions P(entity 1, entity 2) for those potential entity pairs made by a predictive model. As shown in FIG. 1, in some embodiments, the potential entity pairs denote content impressions for respective members, that is, member-content pairs ($m_i$, $c_i$) from a content recommender 106 and second predictions $P_{PM}(m_i, c_i)$ for those potential impressions from the predictive model 104. In turn, the evaluation model 102 outputs evaluation metrics 108 for the predictive model 104.

While not meant to be particularly limited, the evaluation model 102 can include a neural network machine learning architecture that is capable of processing large amounts of text data and generating high-quality natural language responses. In practice, large language models have been used for a wide range of natural language processing (NLP) tasks, including, for example, machine translation, text generation, sentiment analysis, and question answering (i.e., query-and-response). Large language models have also been adapted for other domains, such as computer vision, speech recognition, and software development.

At its core, a large language model consists of an encoder and a decoder. The encoder takes in a sequence of input tokens, such as words or characters, and produces a sequence of hidden representations for each token that capture the contextual information of the input sequence. The decoder then uses these hidden representations, along with a sequence of target tokens, to generate a sequence of output tokens.

The most popular and widely used types of large language models are recurrent neural networks (RNNs) and transformers. RNNs are neural networks that process sequences of inputs one by one, and use a hidden state to remember previous inputs. RNNs are particularly well-suited for tasks that involve sequential data, such as text, audio, and time-series data. In a transformer, on the other hand, the encoder and decoder are composed of multiple layers of multi-headed self-attention and feedforward neural networks. The core of the transformer model is the self-attention mechanism, which allows the model to focus on different parts of an input sequence at different timesteps, without the need for recurrent connections that process the sequence one by one. Transformers leverage self-attention to compute representations of input sequences in a parallel and context-aware manner and are well-suited to tasks that require capturing long-range dependencies between words in a sentence, such as in language modeling and machine translation.

Large language models are typically trained on large amounts of text data, often containing hundreds of millions if not billions of words. To handle the large amount of data, the training process is often highly parallelized. The training process can take several days or even weeks, depending on the size of the model and the amount of training data involved. Large language models can be trained using backpropagation and gradient descent, with the objective of minimizing a loss function such as cross-entropy loss.

Thus, in some embodiments, the evaluation model 102 can be pre-trained to generate high-quality natural language responses to a natural language input. In some embodiments, the evaluation model 102 is further trained during a training phase 110 on training data 112 to determine whether a second entity in an entity pair is relevant to a first entity (e.g., whether an input member-content pair ($m_i$, $c_i$) is relevant or is not relevant/irrelevant). This step can be referred to as additional training, fine-tuning, etc. In some embodiments, the training phase 110 includes fine-tuning the predictions made by the evaluation model 102 until a difference between the predictions made by the evaluation model 102 and known true labels are within a predetermined threshold. For example, fine-tuning can continue until the predictions reach or exceed the accuracy of human annotations. The predetermined threshold can be set as desired, for example, to 75, 90, 95, 98, 99, 99.9 percent agreement. Training phase 110 is discussed in greater detail with respect to FIG. 2. In some embodiments, the training data 112 includes random negative data, raw-feature-cache impression data, human annotated data, transition data, and/or EBR augmented negative data. The training data 112 is discussed in greater detail with respect to FIG. 5.

In some embodiments, the evaluation model 102 is used, during an inference phase 114, to determine whether the second entity in an entity pair evaluated by the predictive model 104 is relevant to the first entity in the respective entity pair (e.g., whether the potential impressions of member-content pairs ($m_i$, $c_i$) received from a content recommender 106 are relevant or not relevant). In other words, the evaluation model 102 can output, during the inference phase 114, a first prediction (e.g., learned relevancy predictions) for any input member-content pair (as shown, first predictions $P_{EM}(m_i, c_i)$).

In some embodiments, the evaluation model 102 is used, during a scoring phase 116, to generate the evaluation metrics 108 for the predictive model 104. In some embodiments, the scoring phase 116 includes a comparison of the first predictions $P_{EM}(m_i, c_i)$ to the second predictions $P_{PM}(m_i, c_i)$ for those same potential impressions. The evaluation metrics 108 are not meant to be particularly limited, but can include, for example, the number of potential impressions marked as "irrelevant" by the predictive model 104 that are labeled "relevant" by the evaluation model 102 (that is, the false positives), and/or conversely, the number of potential impressions marked as "relevant" by the predictive model 104 that are labeled "irrelevant" by the evaluation model 102 (that is, the false negatives). The evaluation metrics 108 can further include false positive and/or false negative trends for the predictive model 104 as additional potential impressions are evaluated.

In addition, the evaluation metrics 108 can further include an identification of one or more features of potential impressions that are commonly mis-assigned by the predictive model 104. For example, consider a scenario where potential impressions for paralegal jobs are often (above any desired predetermined threshold) labeled "relevant" by the predictive model 104 when the respective user is an attorney (e.g., a job function mismatch). In this scenario, the evaluation model 102 can output a natural language response that "the predictive model 104 often allows irrelevant impressions when those impressions are for paralegal jobs made to attorneys". These evaluation metrics 108 can then be used to guide the development (e.g., versioning) of the predictive model 104. Guiding the development of the predictive model 104 is discussed in greater detail with respect to FIG. 3.

In some embodiments, all second predictions $P_{PM}(m_i, c_i)$ for all potential content impressions ($m_i$, $c_i$) are evaluated in this manner by the evaluation model 102. In other embodiments, a subset of the potential impressions ($m_i$, $c_i$) are sampled by the evaluation model 102 and the predictive model 104 is only evaluated against those sampled potential impressions. Sampling can reduce inference costs and improve latency at the cost of accuracy (although, advantageously, accuracy can be constrained as desired by increasing/decreasing sampling). If employed, a sampling strategy should be representative, such as, for example, by sampling the top 3 predicted jobs for a respective member, a random set of 3 of the next 4-10 predicted jobs, any number of random jobs from all sources, any number of random jobs from all impressions, and/or all results from random sampled members.

The predictive model 104 is not meant to be particularly limited, but can include, for example, any system, module, or model configured to predict and/or otherwise identify irrelevant content impressions within a pool of potential impressions. In some embodiments, the predictive model 104 is itself a component of an impression sentinel 118 configured to allow or block potential impressions depending on whether those impressions are predicted, by the predictive model 104, to be irrelevant or relevant. For example, in some embodiments, the impression sentinel 118 includes an impressions filter 120.

In some embodiments, the impressions filter 120 receives the second predictions $P_{PM}(m_i, c_i)$ made by the predictive model 104. In some embodiments, potential impressions $(m_i, c_i)$ which are predicted to be "relevant" are marked as allowed impressions 122. In some embodiments, potential impressions $(m_i, c_i)$ which are predicted to be "irrelevant" are marked as filtered impressions 124. In some embodiments, only the allowed impressions 112 are passed to a client 126.

The content recommender 106 is not meant to be particularly limited, but can include, for example, any system, module, or model configured to source potential member-content pairs for delivery to the client 126. Member-content pairs can include, for example, member-job pairs, member-suggested learning course pairs, member-suggested members to connect with pairs, member-suggested articles to read, etc. In some embodiments, the content recommender 106 is coupled to a database(s) having therein all (or any subset) of the members and available content of a social network (e.g., jobs of a career-based social network, not separately shown). In some embodiments, the content recommender 106 polls the database(s) for random member-content pairs, although rules-based approaches (e.g., feature matching between content and user profile data, etc.) are within the contemplated scope of this disclosure.

Figure 2:
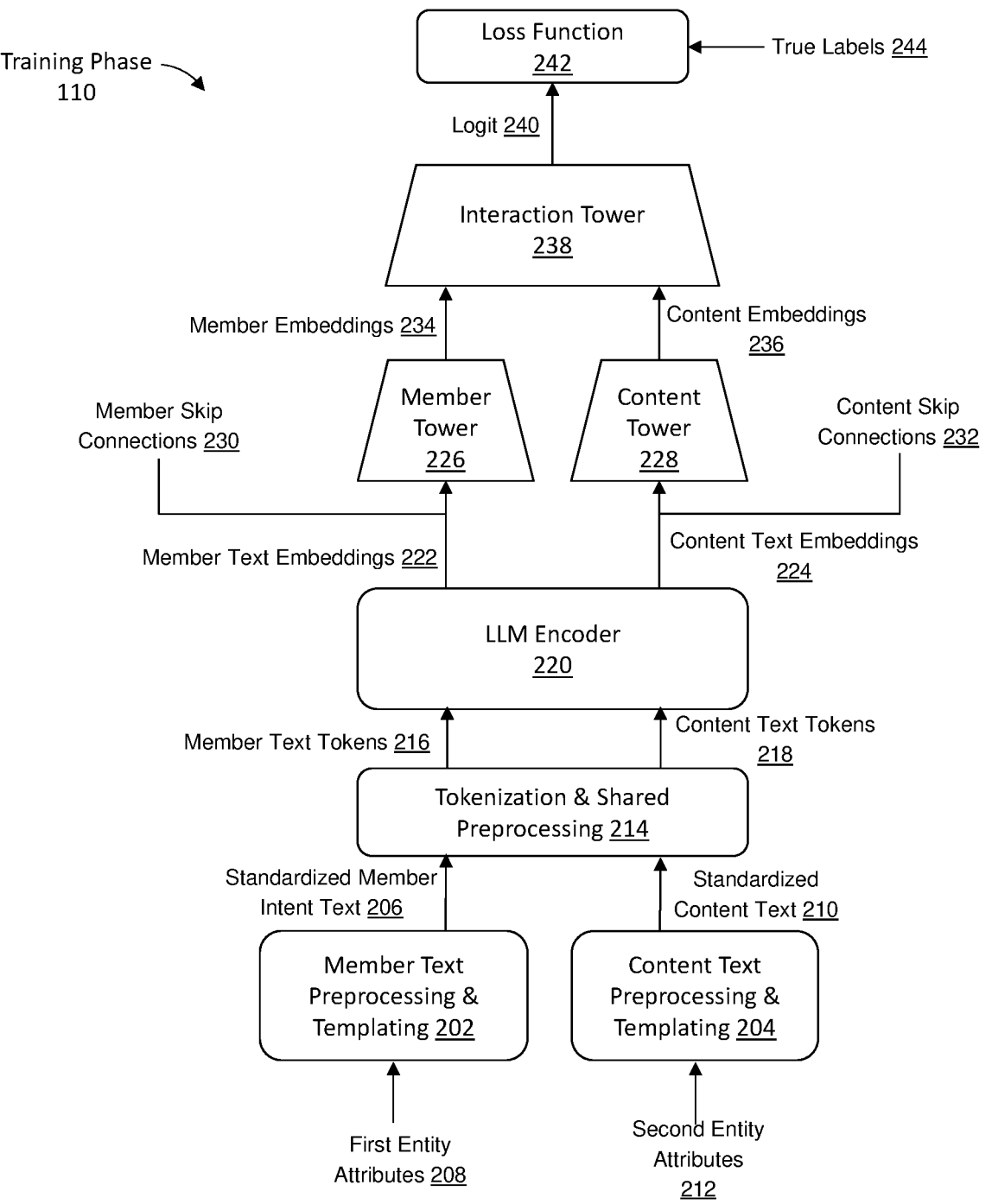
FIG. 2 depicts a block diagram of the training phase 110 of FIG. 1 in accordance with one or more embodiments.

FIG. 2 depicts a block diagram of the training phase 110 of FIG. 1 in accordance with one or more embodiments. As shown in FIG. 2, the training phase 110 begins with member text preprocessing and templating (collectively, member text preprocessing 202) and content text preprocessing and templating (collectively, content text preprocessing 204). Member text preprocessing 202 and content text preprocessing 204 can occur sequentially or concurrently as desired.

In some embodiments, member text preprocessing 202 includes the generation of one or more member text-only templates (here, "standardized member intent text 206") from raw text and standardized member and query entity data (here, "first attributes 208"). Similarly, content text preprocessing 204 includes the generation of one or more content text-only templates (here, "standardized content text 210") from raw text and standardized content entity data (here, "second entity attributes 212").

Text preprocessing and templating can be completed using known processes. For example, a member (a registered user of a career-based social network) might have member entity data including a user-provided current title of "software engineer" at company "Company X", query entity data including a search for "senior software engineer", and content entity data such as a job recommendation for a "product manager" at "Company Y". The first entity attributes 208 and second entity attributes 212 are not limited thereto, but can include any text or entity data, such as data that can be read from the respective user's profile. Continuing with the prior example, member text preprocessing 202 can include the generation of the following standardized member intent text 206: "member ID: 41985; current company: Company X; current title: software engineer; query: senior software engineer". Similarly, content text preprocessing 204 can include the generation of the following standardized content text 210: "member ID: 41985; job recommendation title: project manager; job recommendation company: Company Y".

In some embodiments, member text preprocessing 202 and content text preprocessing 204 rely upon raw member, query, and job text directly extracted from the respective member's profile data. In some embodiments, member text preprocessing 202 and content text preprocessing 204 convert raw member, query, and job text using a predetermined standardized textual interpretation. For example, a member with a standardized title "ID 9" can be mapped to a "software engineer".

In some embodiments, the standardized member intent text 206 and the standardized content text 210 are provided together for tokenization and shared preprocessing 214. Tokenization and shared preprocessing 214 can include tokenizing the standardized member intent text 206 and the standardized content text 210 in a standardized manner using known tokenization processes to produce member text tokens 216 and content text tokens 218, respectively.

In some embodiments, the member text tokens 216 and the content text tokens 218 are provided to a large language model (LLM) encoder 220. In some embodiments, the LLM encoder 220 is configured to generate member text embeddings 222 and content text embeddings 224.

Observe that the LLM encoder 220 is configured to generate both the member text embeddings 222 and the content text embeddings 224. While having individual encoders/embeddings for each entity (e.g., member vs. content, etc.) is possible and within the contemplated scope of this disclosure, those types of encoders are not contextual, meaning, for example, that the same embedding will be generated for "software engineer" regardless of other available context. In contrast, the single LLM encoder 220 can generate different embeddings for "software engineer" depending, for example, on whether it was "searched for" or "recommended", whether it's at company "Company X" or another company, etc. Hence, providing the entire context (both member and content tokens) to the LLM encoder 220 can produce better (more contextual) embeddings than available using separate, entity-specific encoders/embeddings.

In some embodiments, the member text embeddings 222 and content text embeddings 224 are provided to a member tower 226 and a content tower 228, respectively. Optionally, in some embodiments, the member text embeddings 222 can be combined with one or more other member and query features which bypass, or skip, the preprocessing, tokenization, and encoding steps. These other member and query features, themselves sourced from the member and query attributes 208, can be collectively referred to as member skip connections 230. Optionally, in some embodiments, the content text embeddings 224 can be combined with one or more other content features which bypass, or skip, the preprocessing, tokenization, and encoding steps. These other content features, themselves sourced from the second entity attributes 212, can be collectively referred to as content skip connections 232. Combining the member text embeddings 222 and/or content text embeddings 224 with skipped attribute data in this manner can produce more general member and content embeddings.

The member text embeddings 222 and optional member skip connections 230 can be embedded by the member tower 226 to define member embeddings 234. The content text embeddings 224 and optional content skip connections 232 can be embedded by the content tower 228 to define content embeddings 236.

In some embodiments, these member embeddings 234 and content embeddings 236 are then fed into an interaction tower 238 to produce a logit 240. In some embodiments, the interaction tower 238 is a fully connected neural network having any number of internal interaction layers (not separately shown), although other configurations are within the contemplated scope of this disclosure. In some embodiments, the interaction tower 238 is configured to receive, as input, embeddings (e.g., the member embeddings 234 and content embeddings 236) and to produce, as output, the logit 240.

The logit 240 refers to the raw, unnormalized output of the interaction tower 238 before it passes through a sigmoid activation function. The logit 240 can be represented as linear combination z of the input features $(x_i)$ and their corresponding weights $(w_i)$ with a bias (b): $z=w_1x_1+w_2x_2+ \ldots +w_nx_n+b$. In some embodiments, such as during the inference phase 114 (refer to FIG. 1), the logit 240 is input to a sigmoid function (not separately shown) to produce a probability that a given example (that is, a member-content pair) belongs to the positive class in a binary classification task. As used herein, the "positive class" refers to "relevant" content impressions. For example, in some embodiments, a sigmoid function squashes the logit 240 to a value between 0 and 1, where a value of 0 means relevant content and a value of 1 means irrelevant content.

Observe that the interaction tower 238 is configured in a two-tower approach via the member tower 226 and the content tower 228. While shown having only two incoming towers, this is for simplicity and convenience only. The interaction tower 238 can take as input any number of towers (e.g., 2, 3, 4, 5, 10, 20, etc.) as desired and all such configurations are within the contemplated scope of this disclosure. In some embodiments, each of the incoming towers can be entity-specific towers, such as, for example, a job search tower for keywords of the job search queries made by respective members and/or a long text tower for member text phrases such as "I'm looking for work in aeronautics" within their respective profiles (each currently treated within the member tower 226).

In some embodiments, the logit 240 is passed to a loss function 242 along with a set of true labels 244. The loss function 242 is not meant to be particularly limited, but can include, for example, a hinge loss function to penalize incorrect predictions. Without wishing to be bound by theory, it is understood that hinge loss will penalize incorrect predictions without wasting compute/parameters/gradients on actually modeling the probabilities themselves. In some embodiments, internal weights and/or biases of the interaction tower 238 are adjusted to minimize the loss function 242.

While not meant to be particularly limited, the true labels 244 can include, for example, human annotated data (e.g., irrelevant/relevant). In some embodiments, to boost the number of irrelevant impressions (the negative dataset), the true labels 244 also include generated random and augmented negative data. The generation of negative data is discussed with respect to FIG. 5.

The training phase 110, and the resultant trained evaluation model 102 (refer to FIG. 1) can be evaluated across two metrics dimensions: accuracy and internal agreement. Accuracy offers a way to evaluate whether and to what extent the evaluation model 102 agrees with human annotation. Accuracy can be evaluated by comparing the predictions of the evaluation model 102 against human annotations (e.g., irrelevant/relevant, job dismisses when labeled "relevant", etc.). Internal agreement refers to the self-consistency of the evaluation model 102, and can be measured by so-called percent agreement: the percentage of jobs that were assigned the same label by two different human annotators or two model runs (inferences) and/or by any other internal agreement metrics, such as Cohen's kappa.

Figure 3:
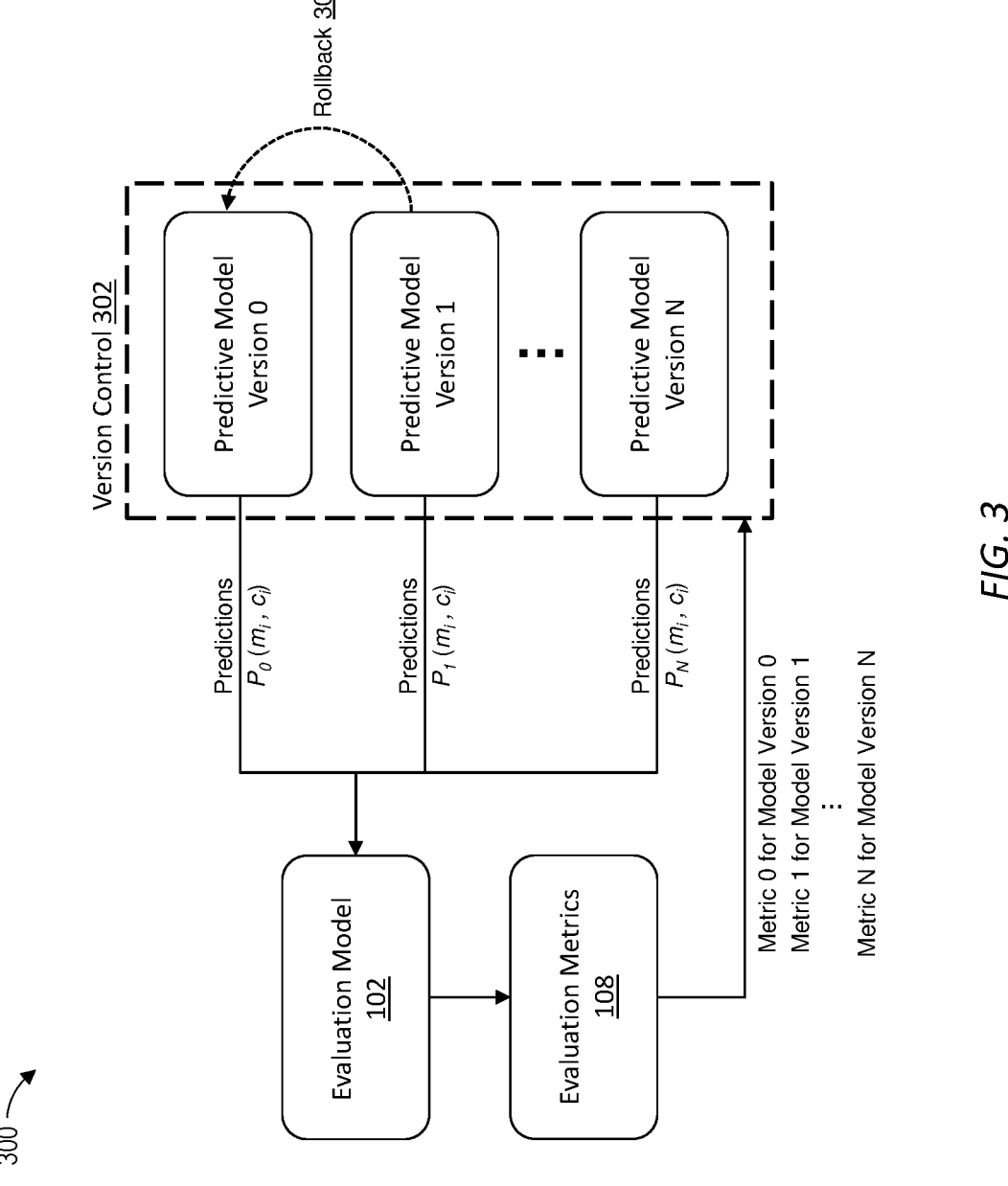
FIG. 3 depicts a block diagram for a model evaluation system for version control of a predictive model in accordance with one or more embodiments.

FIG. 3 depicts a block diagram for a model evaluation system 300 for version control of a predictive model in accordance with one or more embodiments. As shown in FIG. 3, a version control system 302 monitors and/or otherwise supervises the progression of a predictive model (e.g., the predictive model 104) over a number of versions (here, "Predictive Model Version 0", "Predictive Model Version 1", . . . , "Predictive Model Version N").

In some embodiments, the predictions made by the respective versions of the predictive model (here, the "Predictions $P_0(m_i, c_i)$", "Predictions $P_1(m_i, c_i)$", . . . , "Predictions $P_N(m_i, c_i)$") are provided to the evaluation model 102 (refer to FIG. 1). As discussed previously, in some embodiments, the evaluation model 102 is configured to output evaluation metrics 108. In some embodiments, the evaluation model 102 is configured to generate version-specific metrics. For example, the evaluation model 102 can generate a "Metric 0" for the $P_0$ predictions made by Version 0, a "Metric 1" for the $P_1$ predictions made by Version 1, . . . , and a "Metric N" for the $P_N$ predictions made by the Version N of the predictive model.

In some embodiments, the evaluation model 102 and/or version control 302 is further configured to compare the respective evaluation metrics 108 across the versions of the predictive model 104. In some embodiments, the evaluation model 102 and/or version control 302 is further configured to roll back the predictive model 104 to a previous version based on the comparison. In this manner, the evaluation model 102 can be leveraged to guide the development of the predictive model 104.

To illustrate, consider a scenario where the predictions from the Predictive Model Version 1 have less prediction agreement (or a loss in prediction agreement with respect to any predetermined threshold) with the predictions made by the evaluation model 102 than the predictions from the Predictive Model Version 0. In that scenario, the version control 302 can initiate a rollback 304 to revert the predictive model 104 from version 1 to version 0. In some embodiments, rather than initiating the rollback 304 outright, the evaluation model 102 and/or the version control 302 can output a version control warning indicating a need to evaluate the predictive model 104 for a potential rollback.

Figure 4:
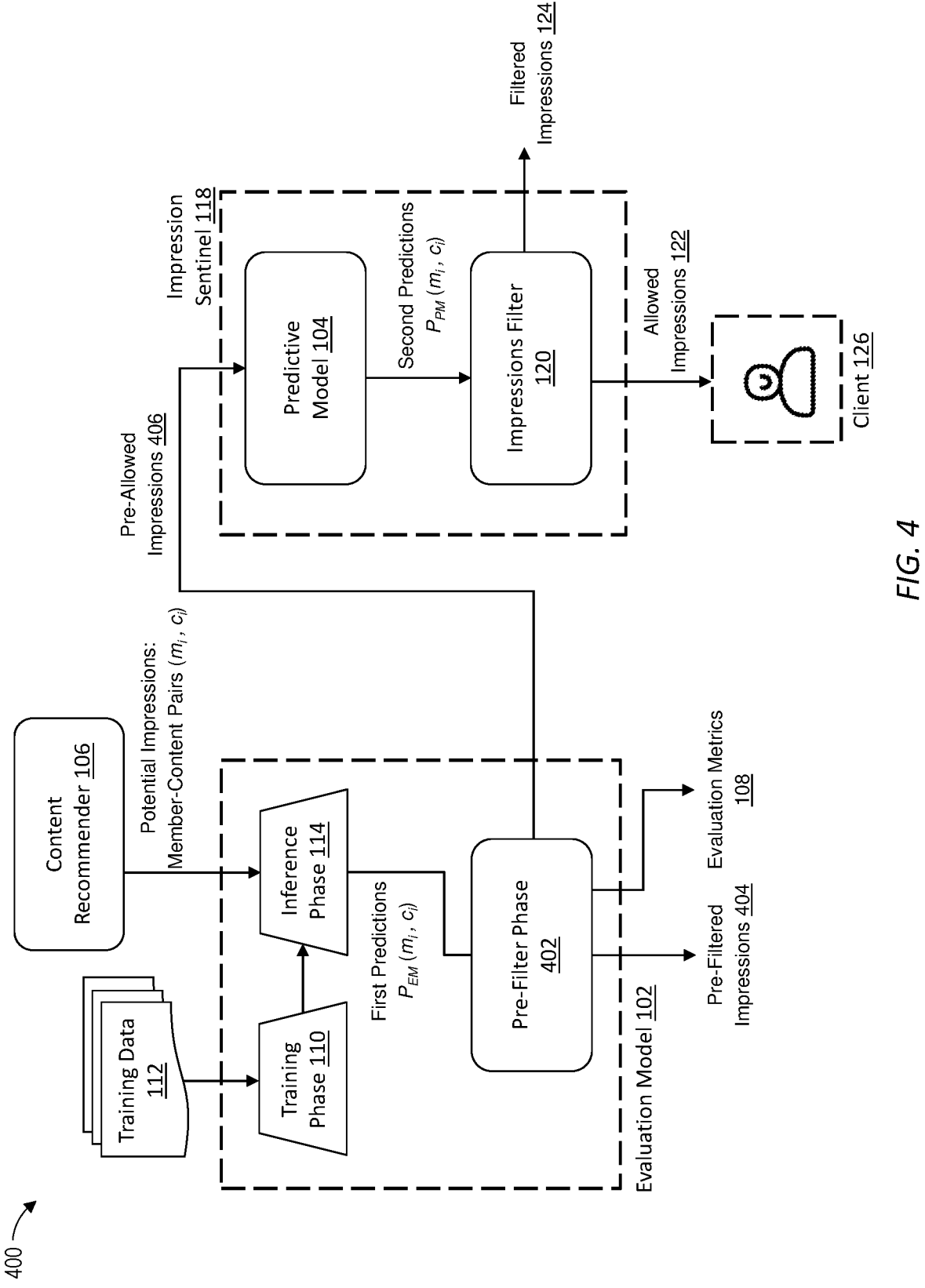
FIG. 4 depicts a block diagram for a model evaluation system powered by an evaluation model to filter entity pairs prior to reaching a predictive model in accordance with one or more embodiments.

FIG. 4 depicts a block diagram for a model evaluation system 400 powered by an evaluation model 102 to filter entity pairs prior to reaching a predictive model 104 in accordance with one or more embodiments. The model evaluation system 400 is configured in a similar manner as described previously with respect to the model evaluation system 100 (refer to FIG. 1), except that the model evaluation system 400 positions the evaluation model 102 upstream of the predictive model 104. Advantageously, in this configuration the evaluation model 102 can pre-filter the potential entity pairs (e.g., potential member-content impressions) prior to reaching the predictive model 104, reducing the amount of entity pairs that need to be evaluated by the predictive model 104 (improving, at minimum, computational overhead). The model evaluation system 400 and the model evaluation system 100 can be used separately or in combination. In some embodiments, the evaluation model 102 is configured to implement any portion (including all) of the features discussed with respect to both the model evaluation system 400 and the model evaluation system 100.

In some embodiments, the evaluation model 102 receives potential entity pairs (entity 1, entity 2) from an upstream system. As shown in FIG. 4, in some embodiments, the potential entity pairs are impressions of member-content pairs $(m_i, c_i)$ from a content recommender 106. In some embodiments, the evaluation model 102 is configured to generate first predictions $P_{EM}(m_i, c_i)$ as discussed previously.

In some embodiments, the evaluation model 102 includes a pre-filter phase 402. In some embodiments, the first predictions $P_{EM}(m_i, c_i)$ are used, during the pre-filter phase 402, to identify so-called negative entity pairs having a second entity that is not relevant to the respective first entity (e.g., member-content pairs for irrelevant content). In some embodiments, these negative entity pairs are removed from the potential entity pairs and can be referred to as pre-filtered impressions 404. Conversely, the remaining, positive entity pairs (e.g., member-content pairs for relevant content) can be passed to the predictive model 104 and can be referred to as pre-allowed impressions 406.

The model evaluation system 400 can then continue in a similar manner as described with respect to FIG. 1. For example, the predictive model 104 can receive the pre-allowed impressions 406 and generate second predictions $P_{PM}(m_i, c_i)$ that are passed to an impressions filter 120. Notably, however, the amount of pre-allowed impressions 406 will be lower than the total potential impressions originally sourced by the content recommender 106. Moreover, as the evaluation model 102 and the predictive model 104 are separate systems with separate training and/or rules-based systems for making predictions, the corpus of pre-filtered impressions 404 will, advantageously, not wholly align to the corpus of negative entity pairs in the second predictions $P_{PM}(m_i, c_i)$. In other words, the evaluation model 102 will pre-filter a subset of the potential entity pairs prior to reaching the predictive model 104 that the predictive model 104 would (had it not been filtered) have evaluated as a positive entity pair (that is, that the predictive model 104 would have marked for inclusion in the allowed impressions 122).

Figure 5:
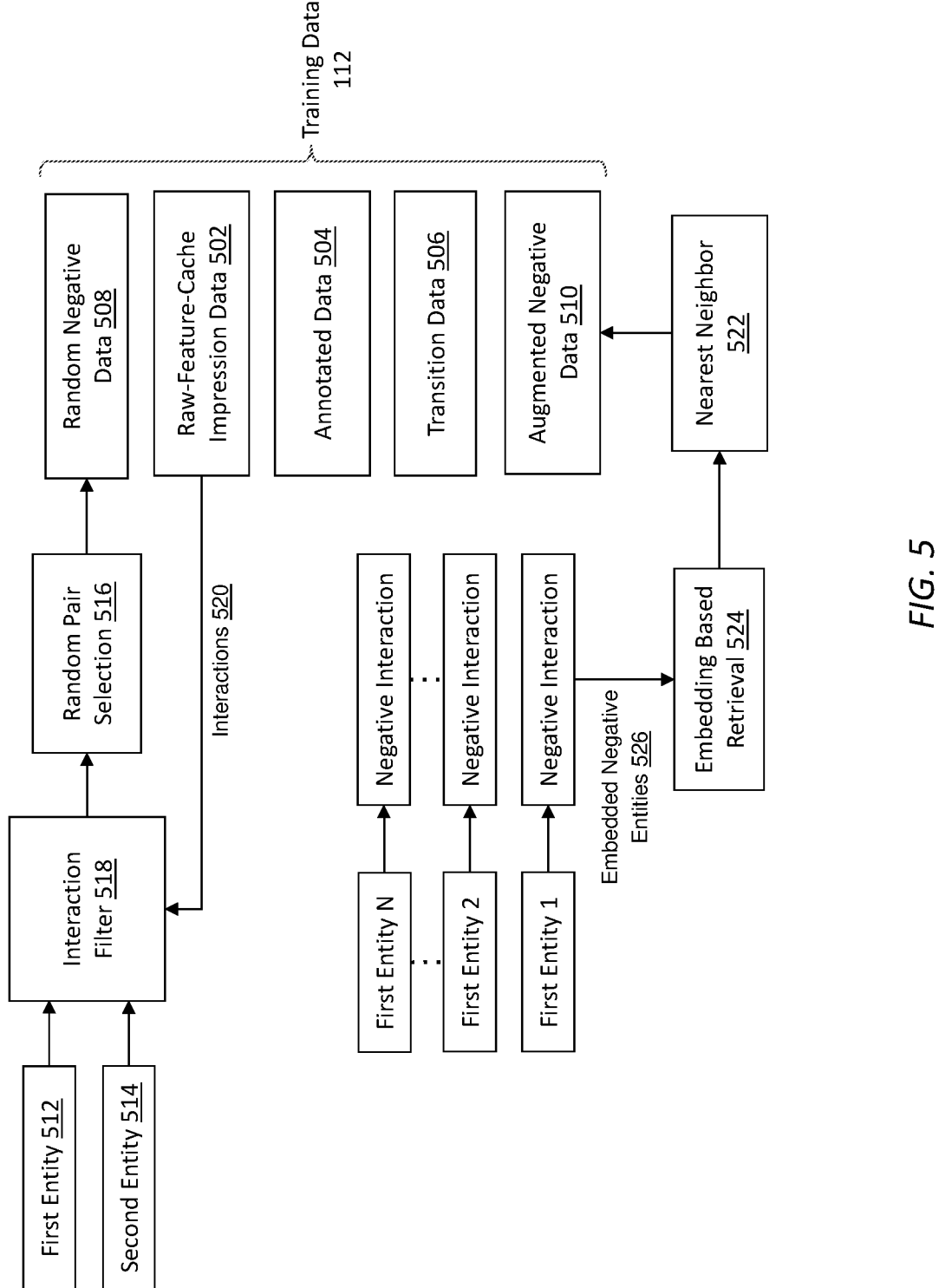
FIG. 5 depicts a block diagram for sourcing training data in accordance with one or more embodiments.

FIG. 5 depicts a block diagram for sourcing the training data 112 in accordance with one or more embodiments. As shown in FIG. 5, the training data 112 can include, for example, raw-feature-cache impression data 502, annotated data 504, and transition data 506.

While not meant to be particularly limited, the raw-feature-cache impression data 502 can include member and content pair interactions such as a number of apply/clicks, skips, dismisses, and/or other interactions by a user of a content impression. In some embodiments, the "skip" and "dismiss" interactions are labeled as negative training data. In some embodiments, the "apply/click" interactions are labeled as positive training data.

While not meant to be particularly limited, the annotated data 504 can include human annotated positive and negative labels for a corpus of sampled entity pairs (e.g., member-content pairs).

While not meant to be particularly limited, the transition data 506 can include a sequence of career transitions for respective members. In some embodiments, transition data 506 is leveraged to identify a seniority mismatch within a member-content impression. For example, a seniority mismatch can be identified for a member-content impression that includes a job which is not found in a sequence (or the next position within the sequence) of career transitions which include the current job of the respective member.

In some embodiments, the raw-feature-cache impression data 502, annotated data 504, and/or transition data 506 offer a relatively low diversity of negative labeled data with respect to positive labeled data. As used herein, a "relatively low" diversity of negative labeled data means that the proportion of negative labeled data is below a predetermined threshold, such as, for example, 20 percent, 10 percent, 5 percent, 3 percent, 1 percent, etc. Moreover, the negative labeled data in those data sets might be sparsely distributed, meaning that the distribution of the underlying types of negative data might not match a known distribution of actual negative data. For example, consider a scenario where actual negative data (e.g. irrelevant impressions) is shown, empirically, to result from 10 percent industry mismatches, 50 percent seniority mismatches, and 40 percent title mismatches, but the negative labeled data available within the raw-feature-cache impression data 502, annotated data 504, and/or transition data 506 is skewed towards industry mismatches (perhaps 50 percent industry mismatches, 30 percent seniority mismatches, and 20 percent title mismatches). In this scenario, relying solely on the negative labeled data in those data sets might bias the evaluation model 102 towards the false distribution of the types of negative samples (that is, the evaluation model 102 might overweigh industry mismatches, etc.).

In some embodiments, these data sources are bolstered by synthetic negative data. In some embodiments, the synthetic negative data includes random negative data 508. In some embodiments, the synthetic negative data includes augmented negative data 510.

In some embodiments, random negative data 508 is generated from a corpus of first entities 512 (e.g., all or some subset of all available members) and second entities 514 (e.g., all or some subset of all available content). In some embodiments, random pair selection 516 generates a number of random first entity-second entity pairs from the first entities 512 and second entities 514. In some embodiments, an interaction filter 518 removes, from the available pool of first-entity-second entity pairs, all pairs which have known interactions. In some embodiments, the raw-feature-cache impression data 502 includes known interactions 520 (e.g., observed member-content pairs), and the interaction filter 518 removes, from the available pool of first-entity-second entity pairs, all pairs which have an interaction history within the interactions 520 (or have an interaction history within any predetermined interval within the interactions 520). Generating random negative data 508 in this manner can address class imbalance by ensuring that the evaluation model 102 is exposed, during the training phase 110, to a variety of negative entity pair examples (e.g., examples of irrelevant content recommendations). This can help the evaluation model 102 learn to differentiate between relevant and irrelevant content recommendations, leading to improved accuracy. Additionally, random negative sampling in this manner can prevent overfitting by ensuring that the evaluation model 102 is exposed to previously unseen entity pairs.

In some embodiments, augmented negative data 510 is generated via an embedding based retrieval (EBR) process. The basic concept of negative data augmentation via EBR involves locating entities that are similar to entities already known to provide negative data (e.g., identifying jobs which are similar to jobs which result in irrelevant impressions with respect to a particular member in a career-based social network context). In this method, similarity between entities can be measured within an embedding space of the entities by determining, for each entity, a vector embedding and determining a distance between the resultant vector embeddings.

In some embodiments, augmented negative data 510 is generated from a known negative entity pair by selecting, from the embedding space, the nearest first entity and/or second entity to the respective entity in the embedding space and using that selected entity to generate a new negative entity pair. Distance between entities in the embedding space can be measured using any suitable distance measure, such as, for example, cosine similarity.

For example, as shown in FIG. 5, the augmented negative data 510 can include a nearest neighbor 522 retrieved via embedding based retrieval 524 from an embedding space having a collection of embedded negative entities 526. The embedded negative entities 526 can themselves be sourced from known negative interactions (e.g., dismisses of a content impression made by a first entity 1, dismisses made by a first entity 2, . . . , dismisses made by a first entity N, etc.). Generating augmented negative data 510 in this manner allows the training data 112 to further leverage the annotated data 504 (e.g., known negative entity pairs) to create more diverse negative labeled data.

In some embodiments, specific augmented negative data 510 can be generated to address a noted deficiency in the evaluation model 102. For example, consider a scenario where the evaluation model 102 makes a first prediction $P_{EM}(m_i, c_i)$) that is shown via human annotation to be inaccurate. Consider further that the reason for the inaccuracy was an industry mismatch which was overlooked by the evaluation model 102. In this scenario, augmented negative data 510 can be generated specifically to increase the amount of negative data of the same underlying type (that is, for negative data caused by an industry mismatch). These techniques allows the evaluation model 102 to be further tuned beyond what is available using conventional training methods.

Figure 6:
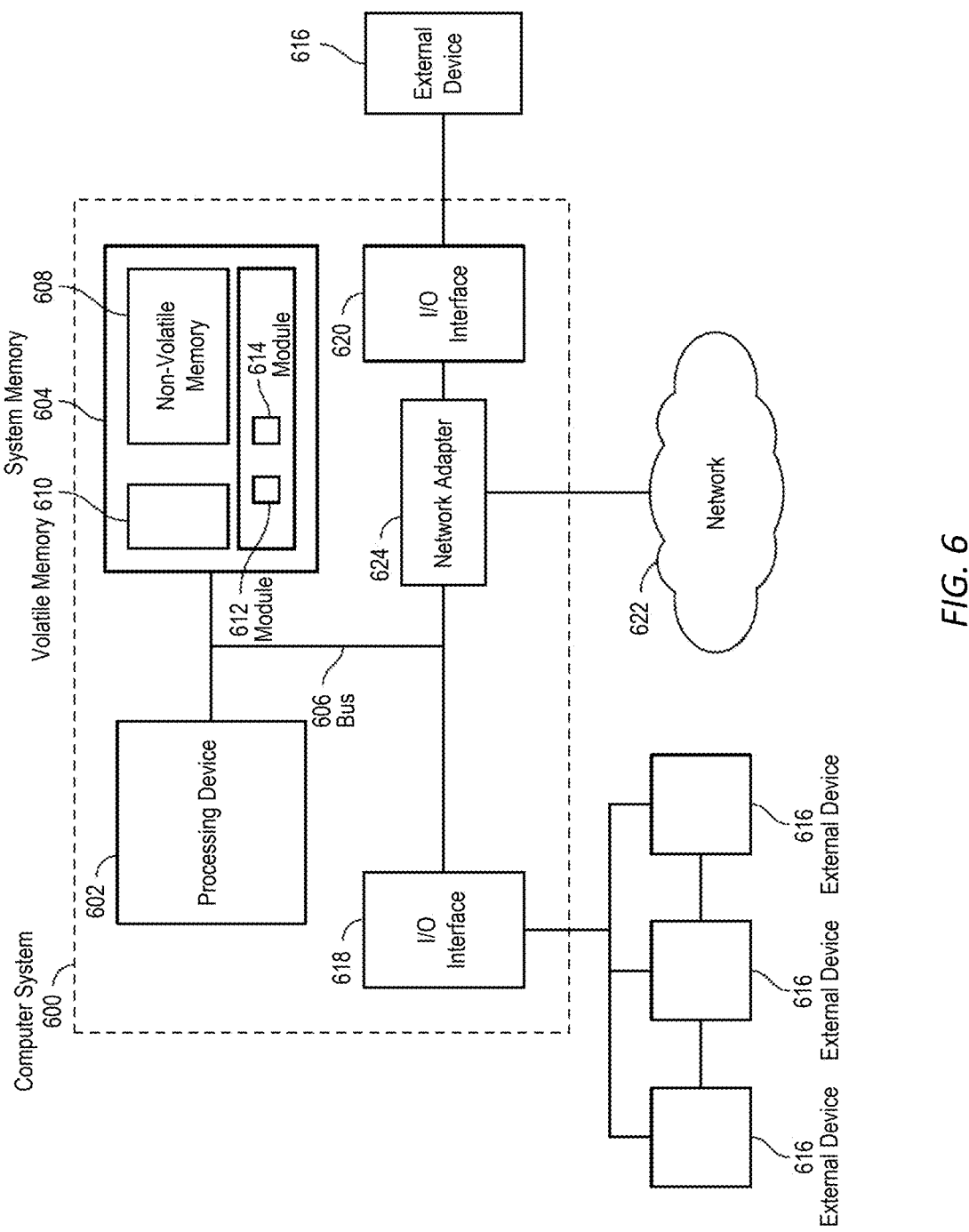
FIG. 6 depicts a block diagram of a computer system according to one or more embodiments.

FIG. 6 illustrates aspects of an embodiment of a computer system 600 that can perform various aspects of embodiments described herein. In some embodiments, the computer system(s) 600 can implement and/or otherwise be incorporated within or in combination with the model evaluation system 100 and/or evaluation model 102 described herein with respect to FIGS. 1-5. In some embodiments, a computer system 600 can be implemented server-side. For example, a remote computer system 600 can be configured to receive a potential entity pair (e.g., a potential member-content impression from content recommender 106) and a respective prediction for the entity pair (e.g., irrelevant/relevant from the predictive model 104), and in response, to respond with an evaluation (e.g., evaluation metrics 108 for the predictive model 104).

The computer system 600 includes at least one processing device 602, which generally includes one or more processors or processing units for performing a variety of functions, such as, for example, completing any portion of the model evaluation system 100 (refer to FIG. 1), training phase 110 (refer to FIG. 2), model evaluation system 300

(refer to FIG. 3), model evaluation system 400 (refer to FIG. 4), and/or the generation of the training data 112 (refer to FIG. 4), described previously herein. Components of the computer system 600 also include a system memory 604, and a bus 606 that couples various system components including the system memory 604 to the processing device 602. The system memory 604 may include a variety of computer system readable media. Such media can be any available media that is accessible by the processing device 602, and includes both volatile and non-volatile media, and removable and non-removable media. For example, the system memory 604 includes a non-volatile memory 608 such as a hard drive, and may also include a volatile memory 610, such as random access memory (RAM) and/or cache memory. The computer system 600 can further include other removable/non-removable, volatile/non-volatile computer system storage media.

The system memory 604 can include at least one program product having a set (e.g., at least one) of program modules that are configured to carry out functions of the embodiments described herein. For example, the system memory 604 stores various program modules that generally carry out the functions and/or methodologies of embodiments described herein. A module or modules 612, 614 may be included to perform functions related to the block diagrams 100, 110, 300, and 400 as described previously herein. The computer system 600 is not so limited, as other modules may be included depending on the desired functionality of the computer system 600. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 602 can also be configured to communicate with one or more external devices 616 such as, for example, a keyboard, a pointing device, and/or any devices (e.g., a network card, a modem, etc.) that enable the processing device 602 to communicate with one or more other computing devices. Communication with various devices can occur via Input/Output (I/O) interfaces 618 and 620.

The processing device 602 may also communicate with one or more networks 622 such as a local area network (LAN), a general wide area network (WAN), a bus network and/or a public network (e.g., the Internet) via a network adapter 624. In some embodiments, the network adapter 624 is or includes an optical network adaptor for communication over an optical network. It should be understood that although not shown, other hardware and/or software components may be used in conjunction with the computer system 600. Examples include, but are not limited to, microcode, device drivers, redundant processing units, external disk drive arrays, RAID systems, and data archival storage systems, etc.

Referring now to FIG. 7, a flowchart 700 for evaluating a predictive model is generally shown according to an embodiment. The flowchart 700 is described with reference to FIGS. 1 to 6 and may include additional steps not depicted in FIG. 7. Although depicted in a particular order, the blocks depicted in FIG. 7 can be, in some embodiments, rearranged, subdivided, and/or combined.

At block 702, the method includes training an evaluation model to output, for an input entity pair including a first entity and a second entity, a prediction including a quantitative measurement of a likelihood of a distance between the second entity and the first entity being greater than a predetermined threshold. In some embodiments, the evaluation model is trained according to a training phase described with respect to FIG. 8 (refer to Blocks 802 to 808).

In some embodiments, the first entity is a member and the second entity is content (or a content impression) for the respective member. In some embodiments, the distance between the second entity and the first entity is a distance in an embedding space. The distance in the embedding space can be measured using any suitable distance measure, such as, for example, cosine similarity. In some embodiments, a distance between the second entity (e.g., content) and the first entity (e.g., a member) greater than the predetermined threshold means that the content is irrelevant for the respective member. Conversely, in some embodiments, a distance between the second entity (e.g., content) and the first entity (e.g., a member) equal to or less than the predetermined threshold means that the content is relevant for the respective member At block 704, the method includes, during an inference phase, inputting, to the evaluation model, a potential entity pair. In some embodiments, the method includes, during the inference phase, outputting, from the evaluation model, a first prediction for the potential entity pair.

At block 706, the method includes, during a scoring phase, receiving, at the evaluation model, a second prediction for the potential entity pair from a predictive model. In some embodiments, the method includes, during the scoring phase, scoring, by the evaluation model, a performance of the predictive model based at least in part on a comparison of the first prediction to the second prediction.

At block 708, the method includes, generating, by the evaluation model, evaluation metrics for the predictive model. In some embodiments, the evaluation metrics include a series of scored predictions for the predictive model over a plurality of predictions of a plurality of respective potential entity pairs.

In some embodiments, training the evaluation model further includes adjusting weights of the evaluation model until a difference between the predictions made by the evaluation model and the true labels is within a predetermined threshold.

In some embodiments, the predictive model is a first version of the predictive model. In some embodiments, the method further includes receiving, at the evaluation model, a third prediction for the potential entity pair from a second version of the predictive model. In some embodiments, the method further includes scoring a performance of the second version of the predictive model based at least in part on a comparison of the first prediction to the third prediction.

In some embodiments, the evaluation metrics further include a comparison of the performance of the first version of the predictive model to the performance of the second version of the predictive model. In some embodiments, the method further includes rolling back the predictive model from the second version to the first version when the comparison of the performance of the first version of the predictive model to the performance of the second version of the predictive model indicates that the second version of the predictive model has a lower performance than the first version of the predictive model.

In some embodiments, the method further includes prefiltering, by the evaluation model, a plurality of potential entity pairs including the potential entity pair provided to the predictive model by removing, from the potential entity pairs, entity pairs having respective first predictions above a predetermined threshold.

Referring now to FIG. 8, a flowchart 800 for a training phase (refer to training phase 110) of an evaluation model is generally shown according to an embodiment. The flowchart 800 is described with reference to FIGS. 1 to 7 and may include additional steps not depicted in FIG. 8. Although depicted in a particular order, the blocks depicted in FIG. 8 can be, in some embodiments, rearranged, subdivided, and/or combined.

At block 802, the method includes generating, by a large language model encoder of an evaluation model, a first embedding for a first entity and a second embedding for a second entity.

At block 804, the method includes combining the first embedding with at least one first entity skip connection that bypassed the large language model encoder and combining the second embedding with at least one second entity skip connection that bypassed the large language model encoder, thereby generating a first entity embedding and a second entity embedding, respectively.

At block 806, the method includes feeding the first entity embedding and the second entity embedding to an interaction tower of the evaluation model to produce a logit.

At block 808, the method includes passing the logit and one or more true labels to a loss function for fine-tuning. In some embodiments, the one or more true labels are labeled training data generated by modifying a corpus of training data having a first proportion of negative labeled data such that the training data includes a second proportion of negative labeled data greater than the first proportion.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the present disclosure are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/ connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Embodiments of the present disclosure may be implemented as or as part of a system, a method, and/or a computer program product at any possible technical detail level of integration. The computer program product may include a computer readable storage medium (or media) having computer readable program instructions thereon for causing a processor to carry out aspects of the present disclosure.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:

training an evaluation model to output, for an input entity pair comprising a first entity and a second entity, a prediction comprising a quantitative measurement of a likelihood of a distance between the second entity and the first entity being greater than a predetermined threshold, wherein training the evaluation model comprises:

generating, by a large language model encoder of the evaluation model, a first embedding for the first entity and a second embedding for the second entity;

combining the first embedding with at least one first entity skip connection and combining the second embedding with at least one second entity skip connection, thereby generating a first entity embedding and a second entity embedding, respectively;

feeding the first entity embedding and the second entity embedding to an interaction tower of the evaluation model to produce a logit; and passing the logit and one or more true labels to a loss function for fine-tuning, wherein the one or more true labels comprise labeled training data generated by modifying a corpus of training data having a first proportion of negative labeled data such that the training data includes a second proportion of negative labeled data greater than the first proportion;

during an inference phase:

inputting, to the evaluation model, a potential entity pair; and outputting, from the evaluation model, a first prediction for the potential entity pair;

during a scoring phase:

receiving, at the evaluation model, a second prediction for the potential entity pair from a predictive model; and scoring, by the evaluation model, a performance of the predictive model based at least in part on a comparison of the first prediction to the second prediction; and generating, by the evaluation model, evaluation metrics for the predictive model, the evaluation metrics comprising a series of scored predictions for the predictive model over a plurality of predictions of the potential entity pair.

2. The method of claim 1, wherein training the evaluation model further comprises adjusting weights of the evaluation model until a difference between the predictions made by the evaluation model and the true labels is within a predetermined threshold.

3. The method of claim 1, wherein the predictive model is a first version of the predictive model, the method further comprising:

receiving, at the evaluation model, a third prediction for the potential entity pair from a second version of the predictive model; and scoring a performance of the second version of the predictive model based at least in part on a comparison of the first prediction to the third prediction.

4. The method of claim 3, wherein the evaluation metrics further comprise a comparison of the performance of the first version of the predictive model to the performance of the second version of the predictive model.

5. The method of claim 4, further comprising rolling back the predictive model from the second version to the first version when the comparison of the performance of the first version of the predictive model to the performance of the second version of the predictive model indicates that the second version of the predictive model has a lower performance than the first version of the predictive model.

6. The method of claim 1, further comprising pre-filtering, by the evaluation model, a plurality of potential entity pairs comprising the potential entity pair provided to the predictive model by removing, from the plurality of potential entity pairs, entity pairs having respective first predictions above a predetermined threshold.

7. The method of claim 1, wherein the negative labeled data comprises, for a respective first entity, a second entity that is irrelevant, wherein positive labeled data comprises, for a respective first entity, a second entity that is relevant, and wherein the training data further comprises the positive labeled data.

8. The method of claim 1, wherein modifying the corpus of training data comprises generating random negative synthetic training data by selecting, from the corpus of training data, one or more first entity-second entity pairs that have never interacted before.

9. The method of claim 1, wherein modifying the corpus of training data comprises generating augmented negative synthetic training data by selecting, from the corpus of training data, one or more first entity-second entity pairs that are within a predetermined distance within an embedding space of another entity pair having a respective second entity known to be irrelevant to its respective first entity.

10. A system having a memory, computer readable instructions, and one or more processors for executing the computer readable instructions, the computer readable instructions controlling the one or more processors to perform operations comprising:

training an evaluation model to output, for an input entity pair comprising a first entity and a second entity, a prediction comprising a quantitative measurement of a likelihood of a distance between the second entity and the first entity being greater than a predetermined threshold, wherein training the evaluation model comprises:

generating, by a large language model encoder of the evaluation model, a first embedding for the first entity and a second embedding for the second entity;

combining the first embedding with at least one first entity skip connection and combining the second embedding with at least one second entity skip connection, thereby generating a first entity embedding and a second entity embedding, respectively;

feeding the first entity embedding and the second entity embedding to an interaction tower of the evaluation model to produce a logit; and passing the logit and one or more true labels to a loss function for fine-tuning, wherein the one or more true labels comprise labeled training data generated by modifying a corpus of training data having a first proportion of negative labeled data such that the training data includes a second proportion of negative labeled data greater than the first proportion;

during an inference phase:

inputting, to the evaluation model, a potential entity pair; and outputting, from the evaluation model, a first prediction for the potential entity pair;

during a scoring phase:

receiving, at the evaluation model, a second prediction for the potential entity pair from a predictive model; and scoring, by the evaluation model, a performance of the predictive model based at least in part on a comparison of the first prediction to the second prediction; and generating, by the evaluation model, evaluation metrics for the predictive model, the evaluation metrics comprising a series of scored predictions for the predictive model over a plurality of predictions of the potential entity pair.

11. The system of claim 10, wherein training the evaluation model further comprises adjusting weights of the evaluation model until a difference between the predictions made by the evaluation model and the true labels is within a predetermined threshold.

12. The system of claim 10, wherein the predictive model is a first version of the predictive model, the method further comprising:

receiving, at the evaluation model, a third prediction for the potential entity pair from a second version of the predictive model; and scoring a performance of the second version of the predictive model based at least in part on a comparison of the first prediction to the third prediction.

13. The system of claim 12, wherein the evaluation metrics further comprise a comparison of the performance of the first version of the predictive model to the performance of the second version of the predictive model.

14. The system of claim 13, the operations further comprising rolling back the predictive model from the second version to the first version when the comparison of the performance of the first version of the predictive model to the performance of the second version of the predictive model indicates that the second version of the predictive model has a lower performance than the first version of the predictive model.

15. The system of claim 10, the operations further comprising pre-filtering, by the evaluation model, a plurality of potential entity pairs comprising the potential entity pair provided to the predictive model by removing, from the plurality of potential entity pairs, entity pairs having respective first predictions above a predetermined threshold.

16. The system of claim 10, wherein the negative labeled data comprises, for a respective first entity, a second entity that is irrelevant, wherein positive labeled data comprises, for a respective first entity, a second entity that is relevant, and wherein the training data further comprises the positive labeled data.

17. The system of claim 10, wherein modifying the corpus of training data comprises generating random negative synthetic training data by selecting, from the corpus of training data, one or more first entity-second entity pairs that have never interacted before.

18. The system of claim 10, wherein modifying the corpus of training data comprises generating augmented negative synthetic training data by selecting, from the corpus of training data, one or more first entity-second entity pairs that are within a predetermined distance within an embedding space of another entity pair having a respective second entity known to be irrelevant to its respective first entity.

19. A computer program product comprising a non-transitory computer readable storage medium having program instructions embodied therewith, the program instructions executable by one or more processors to cause the one or more processors to perform operations comprising:

training an evaluation model to output, for an input entity pair comprising a first entity and a second entity, a prediction comprising a quantitative measurement of a likelihood of a distance between the second entity and the first entity being greater than a predetermined threshold, wherein training the evaluation model comprises:

generating, by a large language model encoder of the evaluation model, a first embedding for the first entity and a second embedding for the second entity;

combining the first embedding with at least one first entity skip connection and combining the second embedding with at least one second entity skip connection, thereby generating a first entity embedding and a second entity embedding, respectively;

feeding the first entity embedding and the second entity embedding to an interaction tower of the evaluation model to produce a logit; and passing the logit and one or more true labels to a loss function for fine-tuning, wherein the one or more true labels comprise labeled training data generated by modifying a corpus of training data having a first proportion of negative labeled data such that the training data includes a second proportion of negative labeled data greater than the first proportion;

during an inference phase:

inputting, to the evaluation model, a potential entity pair; and outputting, from the evaluation model, a first prediction for the potential entity pair;

during a scoring phase:

receiving, at the evaluation model, a second prediction for the potential entity pair from a predictive model; and scoring, by the evaluation model, a performance of the predictive model based at least in part on a comparison of the first prediction to the second prediction; and generating, by the evaluation model, evaluation metrics for the predictive model, the evaluation metrics comprising a series of scored predictions for the predictive model over a plurality of predictions of the potential entity pair.

20. The computer program product of claim 19, wherein the negative labeled data comprises, for a respective first entity, a second entity that is irrelevant, wherein positive labeled data comprises, for a respective first entity, a second entity that is relevant, and wherein the training data further comprises the positive labeled data.

\* \* \* \* \*